May 3, 1932. W. I. JONES 1,856,814
SNAP FASTENER
Filed Oct. 4, 1929
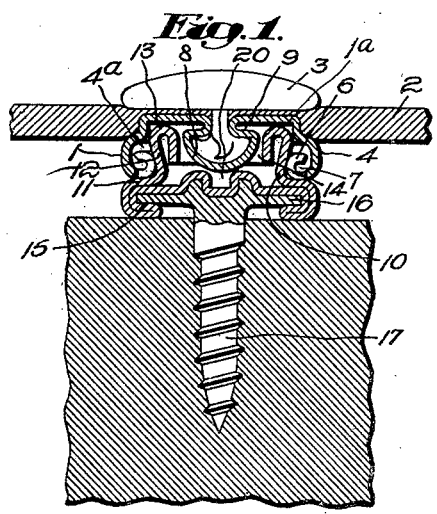
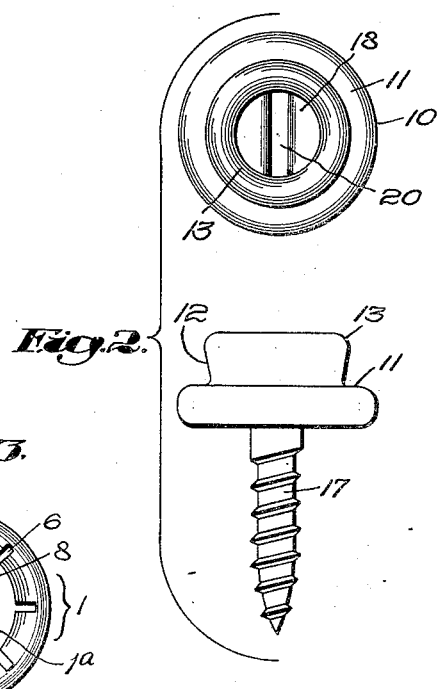
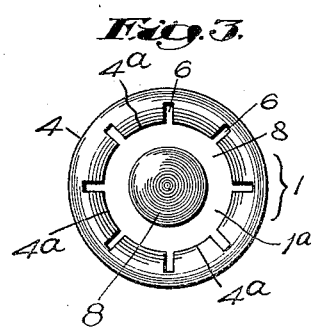
Inventor:
Walter I. Jones,
by Emery, Booth, Varney & Townsend
Attys Patented May 3, 1932

1,856,814

UNITED STATES PATENT OFFICE

WALTER I. JONES, OF ARLINGTON, MASSACHUSETTS, ASSIGNOR TO UNITED-CARR FASTENER CORPORATION, OF CAMBRIDGE, MASSACHUSETTS, A CORPORATION OF MASSACHUSETTS

SNAP FASTENER

Application filed October 4, 1929. Serial No. 397,400.

My invention aims to provide improvements in separable snap fasteners.

In the drawings which illustrate a preferred embodiment of my invention:—

Figure 1 is a part section and part elevation of a stud and socket showing the novel features of my invention;

Fig. 2 includes a plan and a side elevation of the stud; and

Fig. 3 is a plan view of the socket showing the yieldable jaw portions.

Referring to the particular embodiment of my invention illustrated by the drawings, I have shown a socket installation comprising a sheet metal socket part 1 secured against one side of a flexible support 2 by means of a tack 3.

The socket 1 has a base 1ª from the outer periphery of which extends an annular wall 4 having its free edge 4ª curved inwardly to surround a stud-receiving aperture 5, as shown in Figure 1. This inwardly curved portion 4ª is divided by a number of slits 6 to provide yieldable jaw portions 7 (Fig. 3) for engagement with the neck of a cooperating stud.

When the socket 1 is attached to the support 2, the shank of the tack is thrust through the support 2 and into a dome 8 pressed from the base 1ª of the socket. As a final clenching operation the dome 8, together with the upset portion of the tack, is pressed toward the base to provide an abrupt shoulder 9 and thereby strengthen the attachment of the socket.

The stud unit which I have illustrated for use with the above described socket is particularly useful therewith or with any other similar socket having a central dome. The stud unit has a pressed metal cap 10 having a base portion 11 from which extends a neck 12 and a head 13. The material of the central part of the stud head 13 is pressed inwardly to provide a central aperture 14 so that when the stud and socket are engaged (Fig. 1) the dome 8 of the socket may enter the aperture 14 and permit close nesting of the stud within the socket. Thus, I provide for a fastener of minimum thickness while affording maximum provision for a strong, durable and neat appearing attachment.

Below the base 11 of the stud I have provided a pocket 15 into which the head 16 of an attaching screw 17 is fitted (Fig. 1). This pocket 15 has a partition wall 18 which covers the head 16 of the attaching screw and prevents water and moisture, which may pass into the cap through the aperture 14, from coming in contact with the head 16. Thus, I may use a steel screw and a brass, or the like, cap and no rusty head of the attaching element will be exposed through the aperture 14. The wall 18 is depressed to fit into the screw driver slot 19 in the head 16 of the screw so that the blade of a screw driver may be passed through the aperture 14 and inserted in the slot 20 for rotation of the unit.

The double wall below the base 10 of the stud is rolled under the head 16 of the attaching screw 17 (Fig. 1) to hold the parts of the stud unit in assembled relation.

While I have illustrated and described a preferred embodiment of my invention, I do not wish to be limited thereby, because the scope of my invention is best defined in the following claims.

Claims:

1. A snap fastener socket having a base for engagement with a suitable support, an annular wall extending from said base and curved inwardly at its free edge to surround a stud-receiving aperture, said wall being rigid except at said inwardly curved portion which is divided by a number of slits to permit yielding movement thereof for engagement with a cooperating stud and a tack-receiving dome formed integral with and pressed from said base in which the end of a tack may be upset to secure the socket to its support, means providing a relatively small tack-receiving aperture in the base leading to the interior of said dome and said means providing a relatively abrupt shoulder at the base of said dome adjacent to the tack-receiving aperture.

2. A fastener stud comprising, in combination, an attaching element having a head and a shank, a cap secured to the head of said attaching element and having a stud head and neck portion for cooperative engagement with a fastener socket, means providing an aperture through the stud head, and covering means formed as an integral part with the bottom of the cap and extending over the upper face and peripheral edge of the head of the attaching element to conceal the said head from view through the aperture in the stud head.

3. A fastener stud comprising, in combination, an attaching element having a head portion and a shank portion, a cap member secured to the head portion of said attaching element and having a stud head and neck for cooperative engagement with a fastener socket, said stud head having an aperture therethrough, means providing a pocket in the bottom of the cap member into which the head portion of the attaching element is fitted and secured and non-rusting covering means extending over the head portion of the attaching element to conceal the same when viewed through the aperture in the head of the cap member and tool-engaging means provided as a part of the said covering means and adapted to be engaged by a tool inserted through the aperture in the head of the cap member when the shank portion of the attaching element is being secured to a supporting structure.

In testimony whereof, I have signed my name to this specification.

WALTER I. JONES.